United States Patent
Higgins et al.

(10) Patent No.: US 12,440,284 B2
(45) Date of Patent: Oct. 14, 2025

(54) INTERACTIVE TENDON REPAIR GUIDE SYSTEM

(71) Applicant: Arthrex, Inc., Naples, FL (US)

(72) Inventors: Laurence D. Higgins, Naples, FL (US); Oliver Hauck, Munich (DE); Coen Wijdicks, Naples, FL (US); Christopher Adams, Naples, FL (US)

(73) Assignee: Arthrex, Inc., Naples, FL (US)

( * ) Notice: Subject to any disclaimer, the term of this patent is extended or adjusted under 35 U.S.C. 154(b) by 1218 days.

(21) Appl. No.: 17/116,534

(22) Filed: Dec. 9, 2020

(65) Prior Publication Data

US 2022/0175469 A1    Jun. 9, 2022

(51) Int. Cl.
*A61B 34/00*    (2016.01)
*A61B 34/10*    (2016.01)
(Continued)

(52) U.S. Cl.
CPC .............. *A61B 34/25* (2016.02); *A61B 34/10* (2016.02); *G06F 3/04847* (2013.01); *G06T 11/00* (2013.01); *A61B 2034/104* (2016.02); *A61B 2034/105* (2016.02); *A61B 2034/107* (2016.02); *G06T 2210/41* (2013.01)

(58) Field of Classification Search
CPC .............. A61B 34/25; A61B 2034/104; A61B 2034/105; A61B 2034/107; G06F 3/04847; G06T 11/00; G06T 2210/41
See application file for complete search history.

(56) References Cited

U.S. PATENT DOCUMENTS

| | | | |
|---|---|---|---|
| 9,990,472 | B2 | 6/2018 | Gurcan et al. |
| 2004/0068187 | A1 | 4/2004 | Krause et al. |

(Continued)

FOREIGN PATENT DOCUMENTS

| | | |
|---|---|---|
| CN | 108606782 | 10/2018 |
| CN | 110070024 | 7/2019 |
| WO | 2018217162 | 11/2018 |

OTHER PUBLICATIONS

Pires et al., "Wound Area Assessment using Mobile Application," International Conference on Biomedical Electronics and Devices, Jan. 2015, 13 pages. https://www.researchgate.net/publication/270958252_Wound_Area_Assessment_using_Mobile_Application.

(Continued)

*Primary Examiner* — Kee M Tung
*Assistant Examiner* — Khoa Vu
(74) *Attorney, Agent, or Firm* — Greenberg Traurig, P.A.; Michael K. Dixon

(57) ABSTRACT

A system for interactively visualizing different options for tendon repair for a surgeon and for informing the surgeon in a descriptive way of the different options is disclosed. The system may be configured to determine the size of a damaged tendon and propose solutions consisting of the anchor types, number of anchors and a free tendon-to-bone healing area associated with each proposed solution. As such, the system may make a surgeon aware of solutions for which the surgeon was otherwise unaware that are superior in free tendon-to-bone healing area or number of anchors, or both. The system increases the likelihood that a patient will receive the optimum number of anchors and free tendon-to-bone healing area in a tendon repair.

20 Claims, 16 Drawing Sheets

(51) Int. Cl.
*G06F 3/04847* (2022.01)
*G06T 11/00* (2006.01)

(56) References Cited

U.S. PATENT DOCUMENTS

| | | | |
|---|---|---|---|
| 2004/0169673 | A1 | 9/2004 | Crampe et al. |
| 2012/0150243 | A9 | 6/2012 | Crawford et al. |
| 2015/0150490 | A1 | 6/2015 | Xu |
| 2016/0206205 | A1 | 7/2016 | Wu et al. |
| 2016/0331368 | A1* | 11/2016 | Ticker ............... A61B 17/0401 |
| 2018/0206977 | A1* | 7/2018 | Park ..................... A61F 2/0811 |
| 2018/0279943 | A1 | 10/2018 | Budman et al. |
| 2022/0148448 | A1* | 5/2022 | Goel .................... G02B 27/017 |
| 2023/0097234 | A1* | 3/2023 | Falco ................... A61F 2/9517 606/1 |
| 2023/0301590 | A1* | 9/2023 | Chavan ............... A61B 5/4523 |

OTHER PUBLICATIONS wounddesk.com, "Mobile enhanced wound management," Accessed Aug. 28, 2019, 10 pages. https://wounddesk.com/.

Wild et al., "Digital measurement and analysis of wounds based on color segmentation," European Surgery, published Jan. 12, 2008. https://www.researchgate.net/publication/226949491_Digital_measurement_and_analysis_of_wounds_based_on_color_segmentation.

* cited by examiner

• MEASUREMENT OF FOOTPRINT SIZE

• MEASUREMENT OF TEAR SIZE

• FINISHED ROTATOR CUFF REPAIR

• ANCHOR PLACEMENT

SUTURE ANCHORS
"CROSS-SECTIONAL AREA"

- FIBERTAK

- SWIVELOCK

INTERACTIVE TENDON REPAIR GUIDE SYSTEM

FIELD OF THE INVENTION

The disclosure relates generally to tendon repair systems, and more particularly, to guide systems for tendon repair procedures.

BACKGROUND

Tendon repair procedures involve a surgeon using one or more anchors to secure portions of the tendon at a tear site within a patient. There are many different tendon anchors having different configuration and sizes. Surgeons often use tendon anchors with which they are most comfortable using or having the most experience using. While such choice may suit the surgeon well, the patient is often underserved because a more favorable tendon anchor that better suits the patient's tendon tear exists. Thus, a need exists for matching tendon anchors and other related options for repairing a torn tendon in a patient.

SUMMARY OF THE INVENTION

A system for interactively visualizing different options for tendon repair for a surgeon and for informing the surgeon in a descriptive way of the different options is disclosed. The system may be configured to determine the size of a damaged tendon and propose solutions consisting of the anchor types, number of anchors and a free tendon-to-bone healing area associated with each proposed solution. As such, the system may make a surgeon aware of solutions for which the surgeon was otherwise unaware that are superior in free tendon-to-bone healing area or number of anchors, or both. The system increases the likelihood that a patient will receive the optimum number of anchors and free tendon-to-bone healing area in a tendon repair.

In at least one embodiment, the tendon repair system may function as a guide for one or more tendon repairs in a human body, such as, but not limited to being, shoulder, elbow, achilles, and proximal hamstring. In at least one embodiment, the tendon repair system may function as a guide for all tendon repairs in a human body. In yet another embodiment, the tendon repair system may be a guide for rotator cuff repair.

The tendon repair system may be configured to interactively visualize different options for the surgeon and inform the surgeon in a descriptive way such as, but not limited to, graphically, numerically or descriptively, or any combination thereof. The tendon repair system may use one or more graphical user interfaces to receive input from and to communicate results to a user. The graphical user interface may be one or more of a computer, a laptop, a tablet device, a phablet, a server, a mobile device, a smartphone, a smart watch, and/or any other type of computing device. The graphical user interface may be any display device currently existing or heretofore yet to be conceived. The graphical user interface may be in communication with the processor via wired or wireless communications paths, or a combination thereof.

The tendon repair system may be configured to receive input of the dimensions of a tendon tear and output solutions to a user, such as a surgeon or related support staff. The tendon repair system may receive other input as well. The tendon repair system may either receive input from a user or other person or may already have solution options stored within the system, such as, but not limited to, being stored in the memory. In particular, the tendon repair system may receive or may already have stored within the system minimum and maximum distances to be used between each type of anchor and between different types of anchors. The tendon repair system may receive or may already have stored within the system dimensions for each type of anchor.

The tendon repair system may generate a tear area size based off of dimensions inputted into the system and one or more solutions of a specific type of tendon anchor and a specific number of those tendon anchors. The tendon repair system may generate a solution including one or more tendon anchors and the specific type of tendon anchor. The tendon repair system may generate a solution including multiple solutions of different types of tendon anchors. The system may include multiple solutions. In at least one embodiment, the tendon repair system may decide which and how many anchors to use in a tendon repair procedure.

In at least one embodiment, the tendon repair system may be configured to include a memory that stores instructions and a processor that executes the instructions to perform operations. The operations may include receiving input of dimensions of a tear in a tendon. The operations may include generating a tear area size of the tear in the tendon based on the dimensions. The operations may include generating a number of tendon anchors that fit the tear area size. The operations may include generating a free healing area for the tendon as an area not covered by the tendon anchors. The operations may include generating output displayed on a graphical user interface.

In at least one embodiment, the tendon repair system may include displaying output including the number of tendon anchors that fit the tear area size. The tendon repair system may include displaying output including a particular type of tendon anchors that fit the tear area size. The tendon repair system may include displaying output including the free healing area for the tendon as an area not covered by the tendon anchors. The tendon repair system may include displaying output including multiple types of tendon anchors and the number of each type of tendon anchor needed. The tendon repair system may include displaying output including multiple types of tendon anchors and the number of each type of tendon anchor needed comprises displaying at least one combination with multiple types of tendon anchors. The tendon repair system may include displaying output comprising different repair techniques.

The tendon repair system may include generating output displayed on a graphical user interface including displaying output that includes a graphical representation of one or more proposed solutions. The tendon repair system may include displaying at least one graphical representation of a plurality of proposed solutions. The tendon repair system may include displaying output that includes at least one numerical and written description of a solution. The tendon repair system may include displaying output that includes a graphical representation, numerical and written descriptions of one or more proposed solutions. The tendon repair system may include displaying output that includes a plurality of graphical representations, numerical and written descriptions of a plurality of proposed solutions. The tendon repair system may include receiving a minimum distance between anchors and receiving a maximum distance between anchors.

An advantage of the tendon repair system is that the system may be configured to function as a guide for one or more tendon repairs in a human body, such as, but not limited to being, shoulder, elbow, achilles, and proximal hamstring.

Another advantage of the tendon repair system is that the system may maximize the number of tendon anchors being used and maximize the free healing area, thereby maximizing the potential of a patient to fully recovery from surgery.

Yet another advantage of the tendon repair system is that the system may provide a graphical representation of solutions giving a user the ability to see the differences between the possible solutions.

Another advantage of the tendon repair system is that the system may encourage a surgeon to make a better choice of tendon anchor for a particular case that provides a great free healing area in the torn tendon than if the surgeon were left to simply choose a tendon anchor the surgeon uses most often.

These and other embodiments are described in more detail below.

DETAILED DESCRIPTION OF THE FIGURES

As shown in FIGS. 1-18, a system 10 for interactively visualizing different options for tendon repair for a surgeon and for informing the surgeon in a descriptive way of the different options is disclosed. The system 10 may be configured to determine the size of a damaged tendon and propose solutions consisting of the anchor types, number of anchors, minimum and maximum distance between anchors and a free tendon-to-bone healing area associated within each proposed solution. As such, the system 10 may make a surgeon aware of solutions for which the surgeon was otherwise unaware that are superior in free tendon-to-bone healing area or number of anchors, or both. The system 10 may increase the likelihood that a patient 32 will receive the optimum number of anchors and free tendon-to-bone healing area in a tendon repair.

Figure 1:
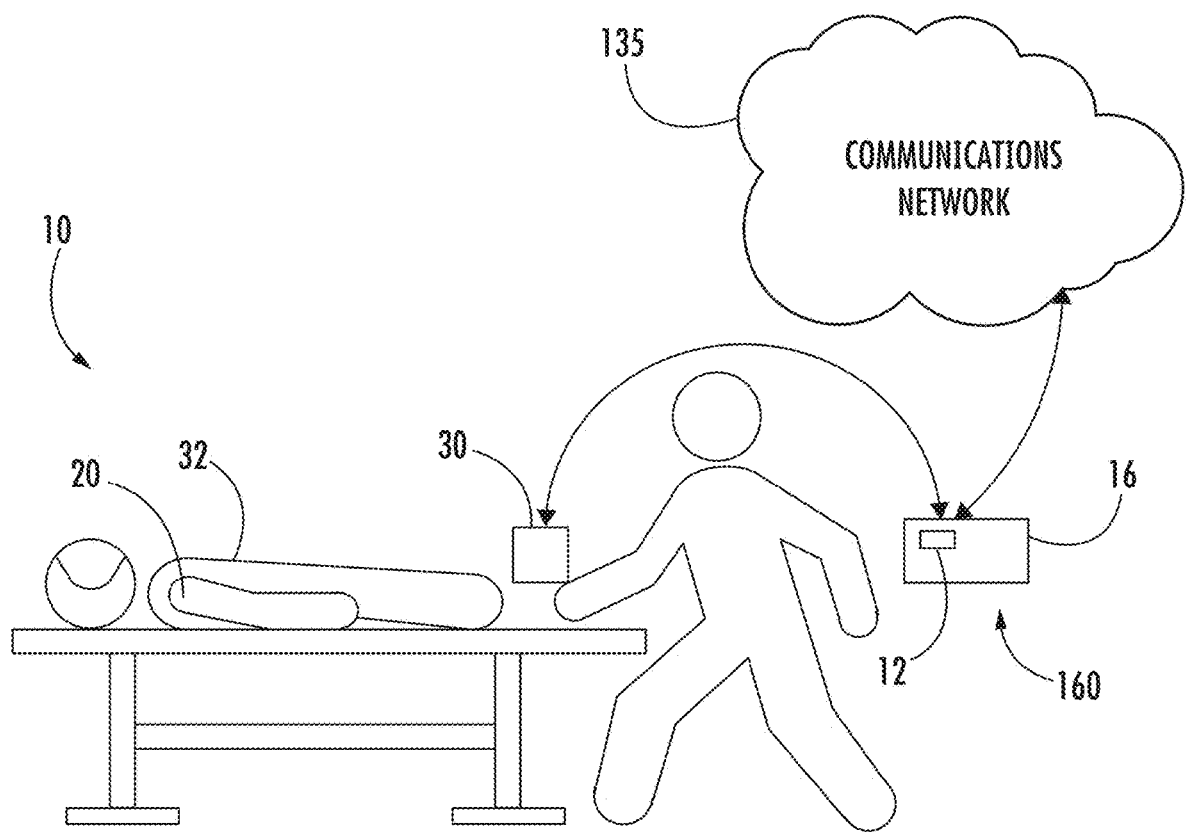
FIG. 1 is a schematic diagram of a system for interactively visualizing different options for tendon repair.

In at least one embodiment, the tendon repair system 10 may be configured to function as a guide for one or more tendon repairs in a human body, such as, but not limited to being, shoulder, elbow, achilles, and proximal hamstring. In at least one embodiment, the tendon repair system 10 may be configured such that to function as a guide for all tendon repairs in a human body. In yet another embodiment, the tendon repair system 10 may be configured to function as a guide for rotator cuff repair. The tendon repair system 10 may include a memory 12, as shown in FIG. 1, that stores instructions and a processor 16 that executes the instructions to perform operations. The operations may include receiving input of dimensions of a tear 20 in a tendon 22. The operations may include generating a tear area size 24 of the tear 20 in the tendon 22 based on the dimensions. The operations may include generating a number of tendon anchors 26 that fit the tear area size 24. The operations may include generating a free healing area 28 for the tendon 22 as an area not covered by the tendon anchors 26. The operations may include generating output displayed on a graphical user interface 30.

Figure 17:
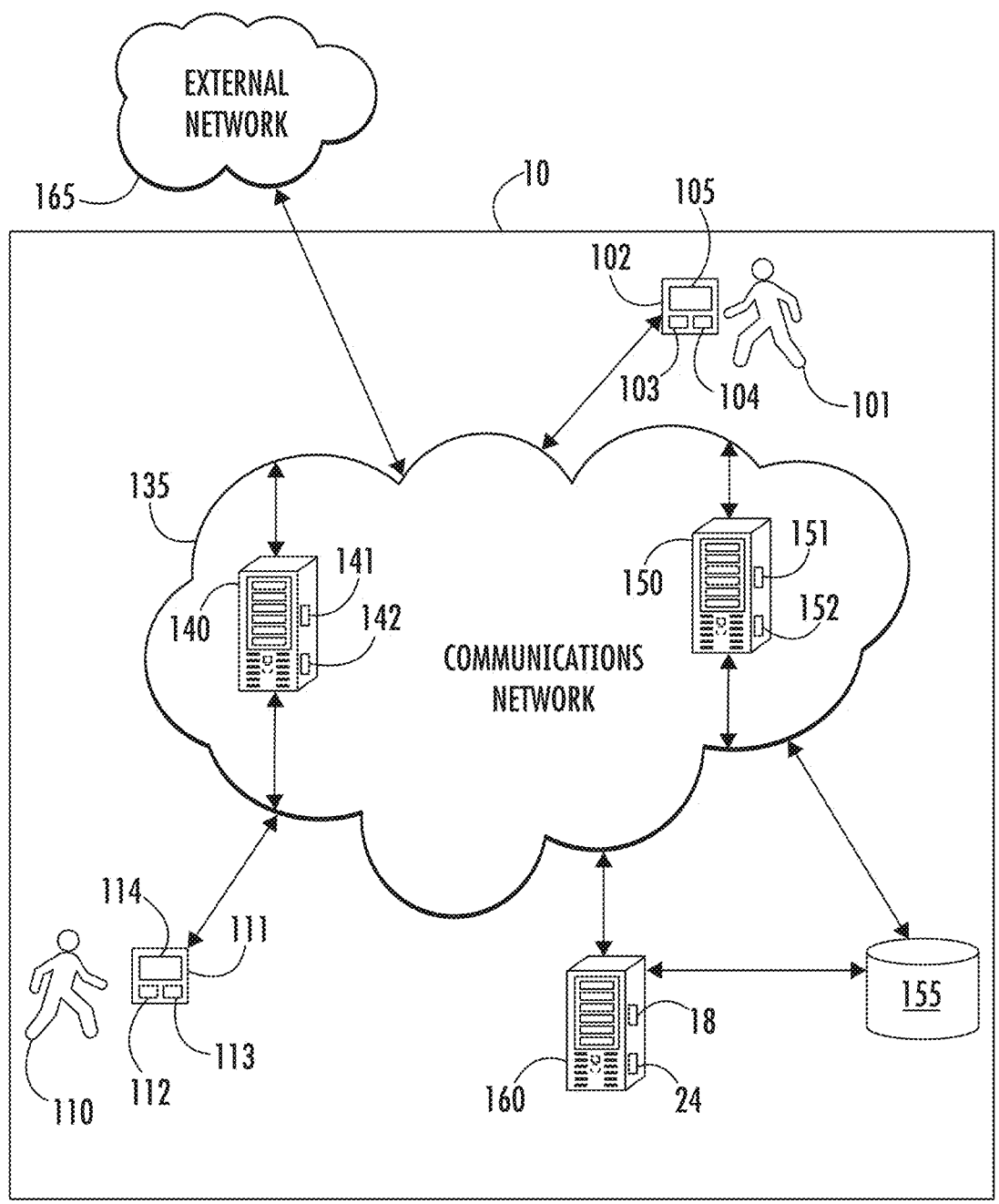
FIG. 17 is a schematic diagram of the system for interactively visualizing different options for tendon repair including a communications network enabling users to access data collected via the system from remote locations.

The tendon repair system 10 may be configured to interactively visualize different options for the surgeon and inform the surgeon in a descriptive way such as, but not limited to, graphically, numerically or descriptively, or any combination thereof. The tendon repair system 10 may use one or more graphical user interfaces 30 to communicate results to a user. The graphical user interface 30, 105, 114, as shown in FIGS. 1 and 17, may be one or more of a computer, a laptop, a tablet device, a phablet, a server, a mobile device, a smartphone, a smart watch, and/or any other type of computing device. The graphical user interface 30 may be any display device currently existing or heretofore yet to be conceived. The graphical user interface 30 may be in communication with the processor 16 via wired or wireless communications paths, or a combination thereof.

The tendon repair system 10 may be configured to receive input of the dimensions of a tendon tear and output solutions to a user, such as a surgeon or related support staff. The tendon repair system 10 may either receive input from a user or other person or may already have solution options stored within the system 10, such as, but not limited to, being stored in the memory 12. In particular, the tendon repair system 10 may receive or may already have stored within the system 10 the minimum distance to be used between each type of anchor 26 and between different types of anchors 26. The tendon repair system 10 may receive or may already have stored within the system 10 dimensions for each type of anchor 26.

Figure 2:
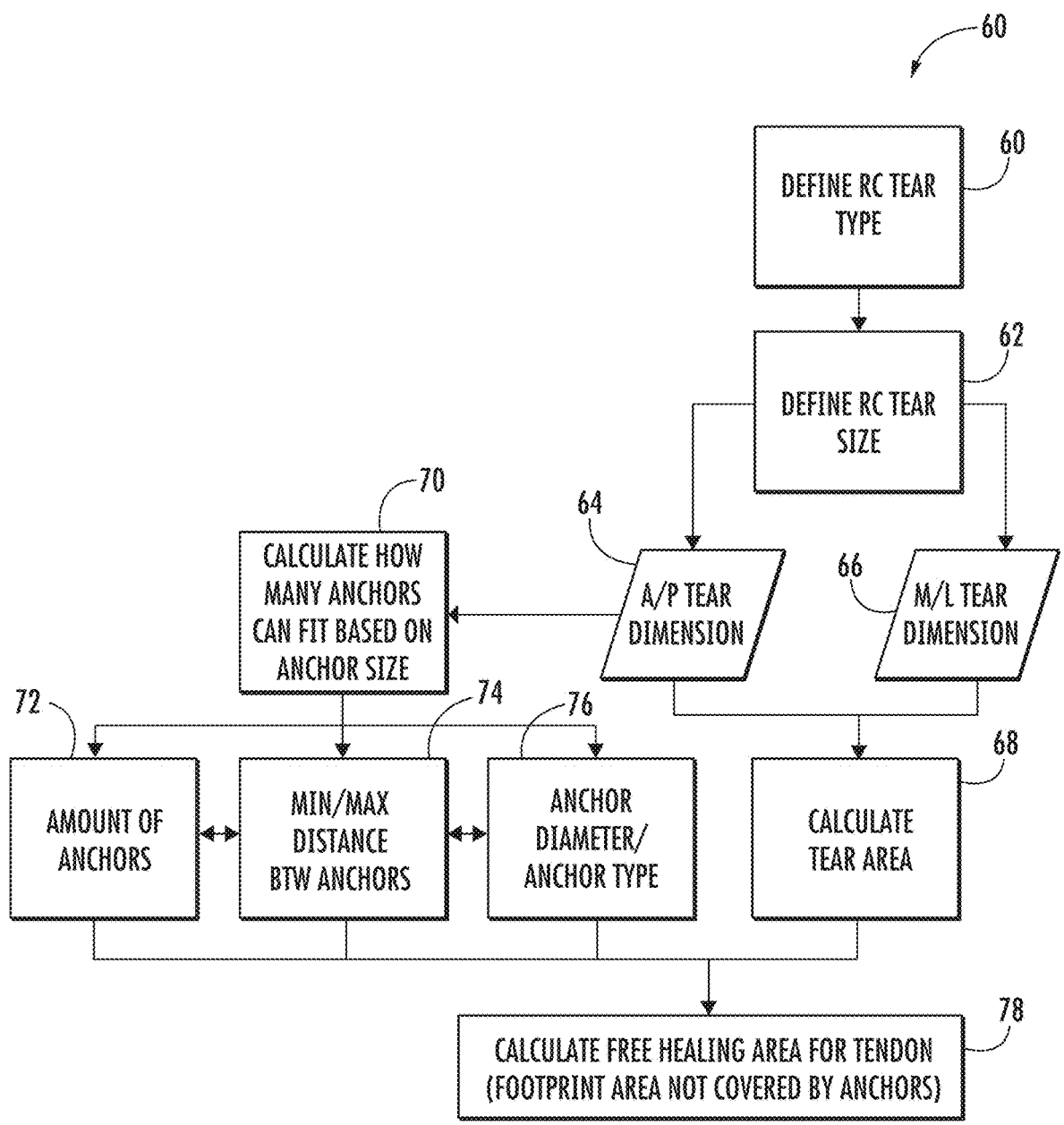
FIG. 2 is a flow diagram of a method for determining anchors and other options to be used in a tendon repair procedure.
Figure 4:
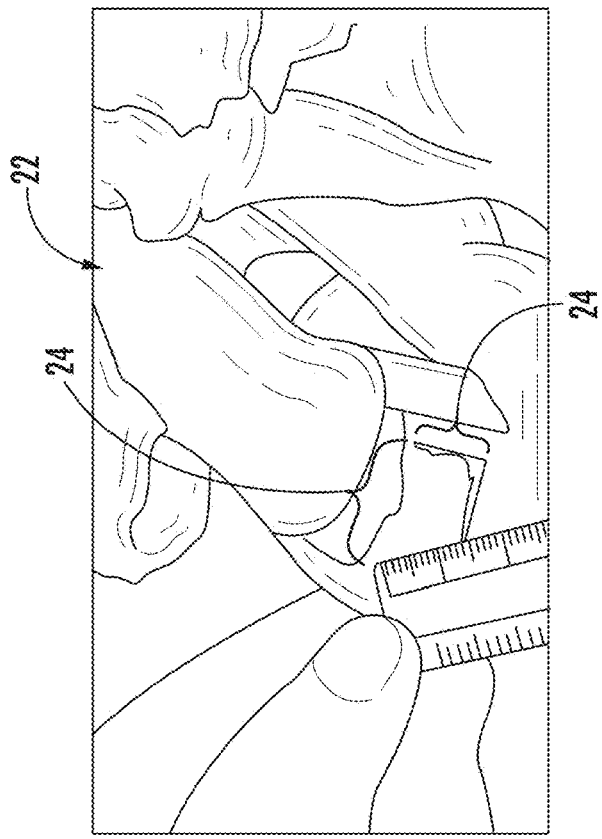
FIG. 4 is another perspective view of a tear in a tendon being measured to determine a tear area size.
Figure 3:
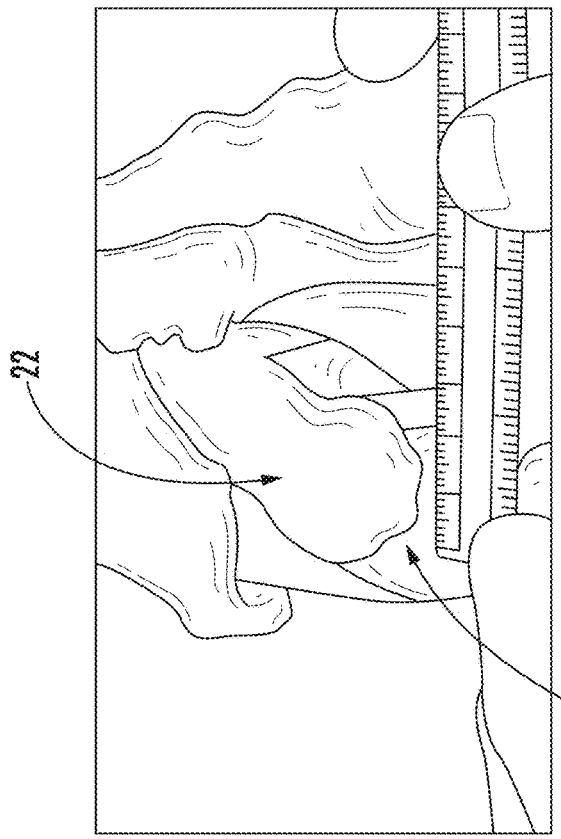
FIG. 3 is a perspective view of a tear in a tendon being measured to determine a tear area size.
Figure 9:
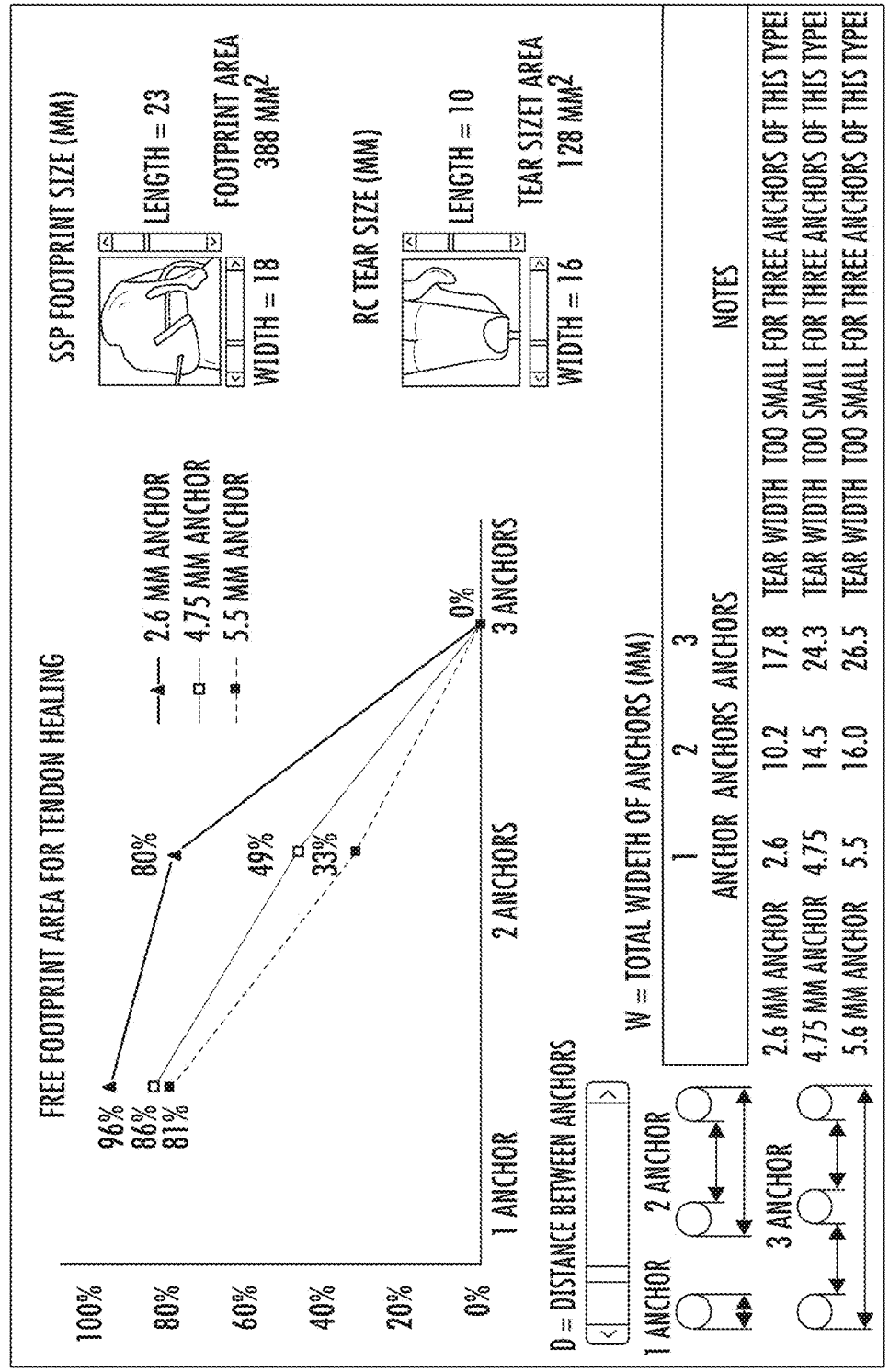
FIG. 9 is a graphical depiction of free footprint healing area for tendon healing relative to one, two and three anchors being used for three different cross-sectional sized anchors.
Figure 10:
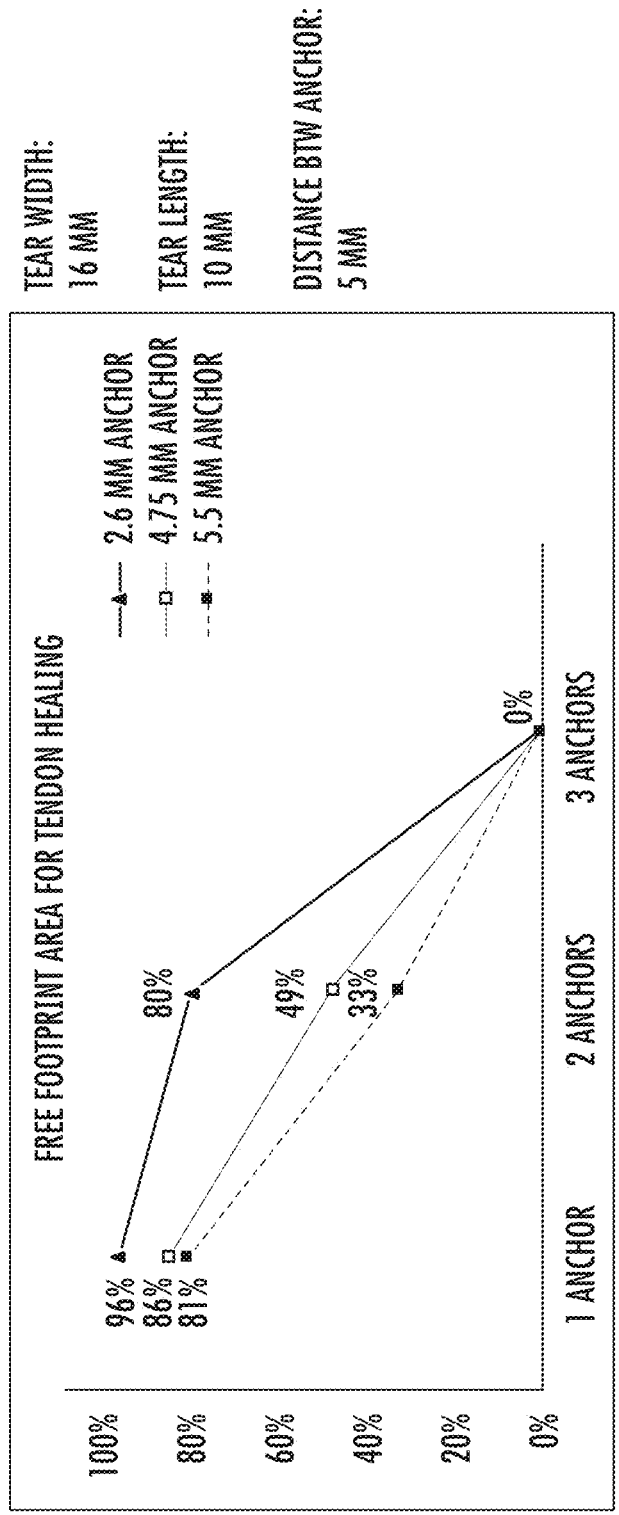
FIG. 10-15 are a graphical depictions of different examples with particular tear widths, tear lengths, and distances between anchors to display free footprint healing area for tendon healing relative to one, two and three anchors being used for three different cross-sectional sized anchors.
Figure 11:
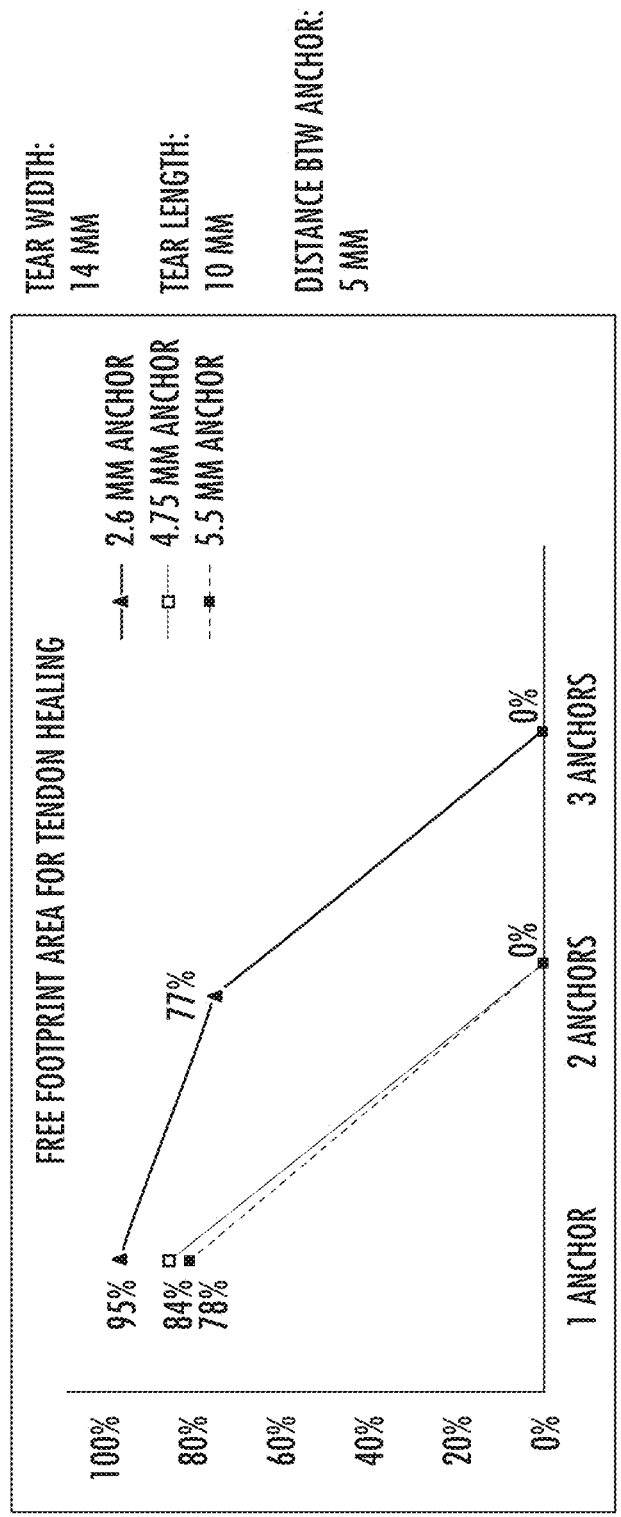
Figure 12:
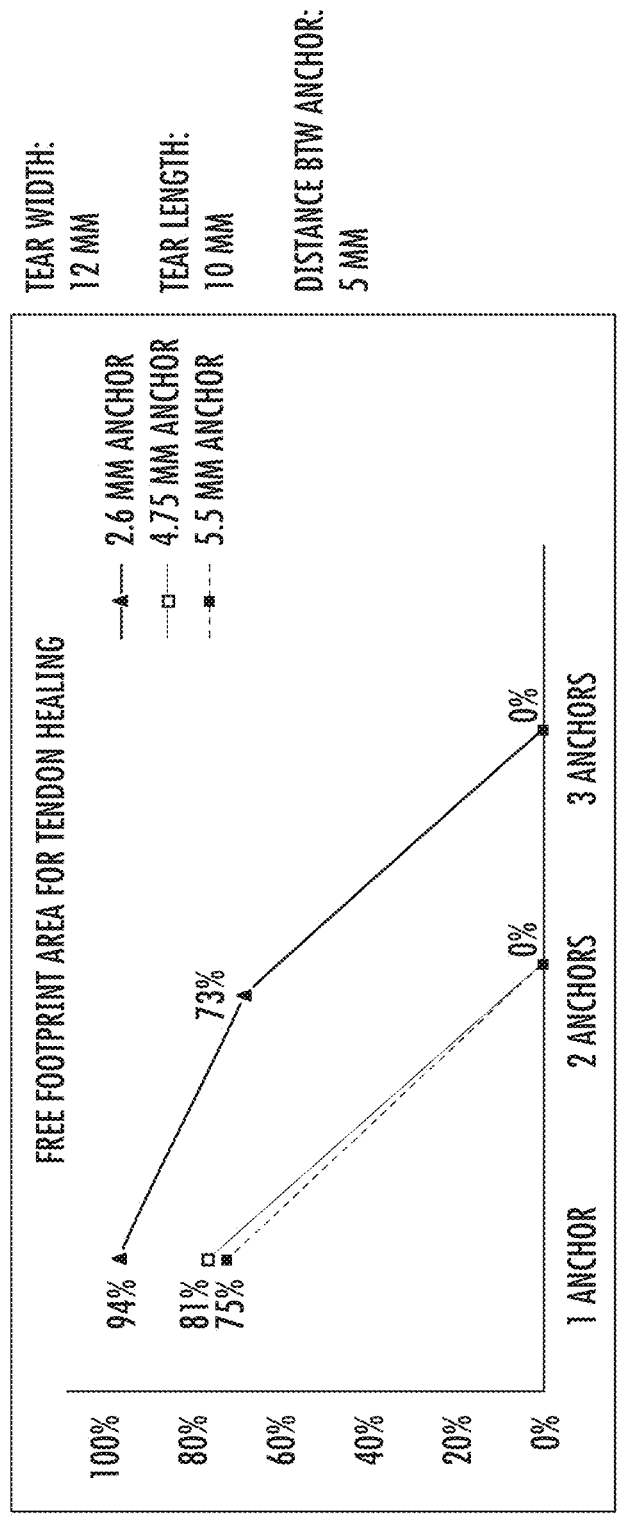
Figure 13:
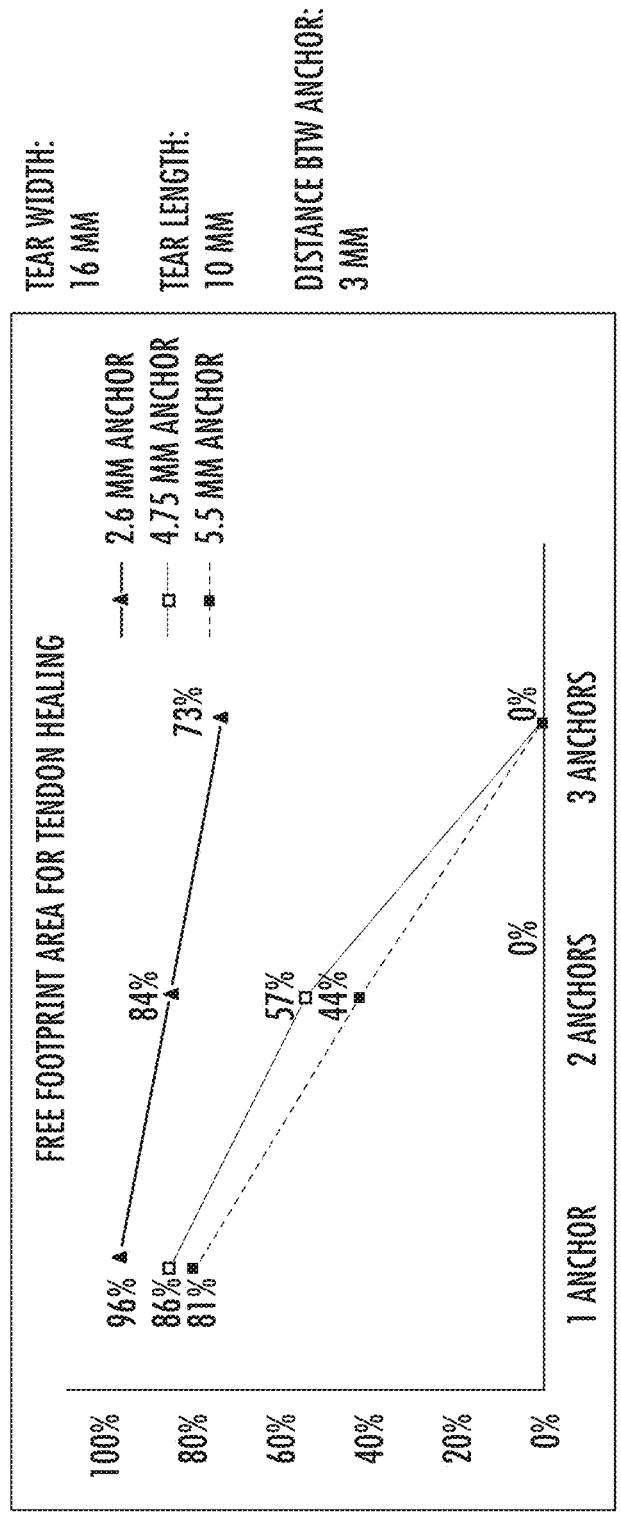
Figure 14:
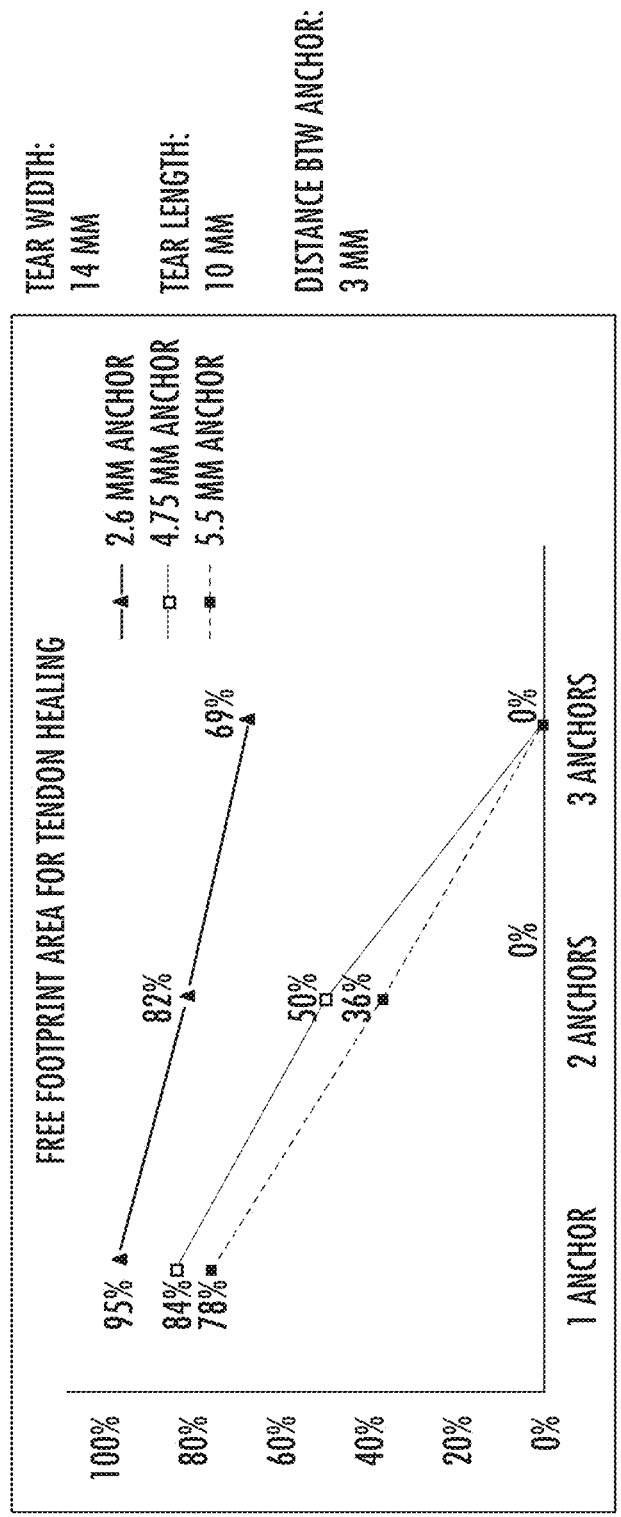
Figure 15:
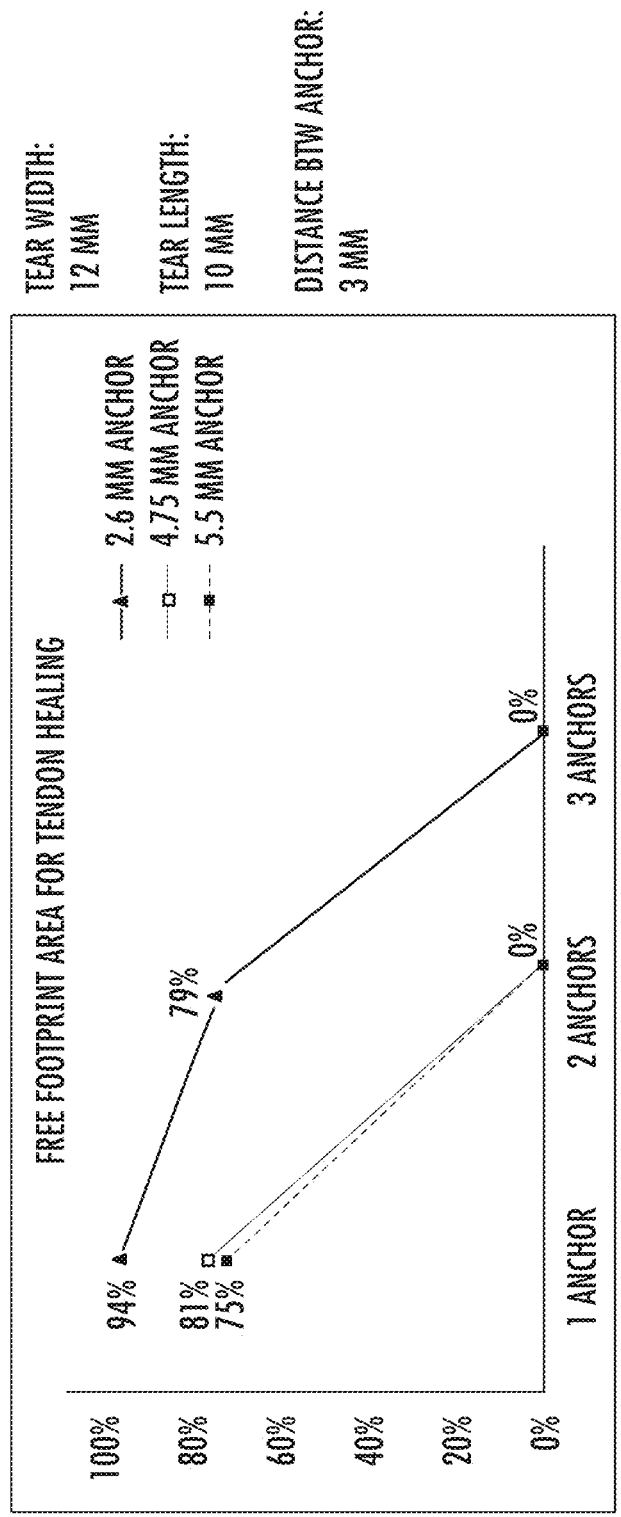

The tendon repair system 10 may generate a tear area size at 78, as shown in FIGS. 2 and 9, and one or more solutions of a specific type of tendon anchor 26 at 76, a specific number of those tendon anchors 26 at 70 and 72 and minimum and maximum distances to be used between each type of anchor 26 and between different types of anchors 26 at 74. The tendon anchors 26 may have different cross-sectional areas, and if cylindrical, different dimensions. The choices of tendon anchors 26 stored within the memory 12 of the system may be manufactured by one or multiple entities. The tendon repair system 10 may receive input of the tear type at 60. The tendon repair system 10 may receive input of the tear size at 62 including the A/P tear dimension at 64 and the M/L tear dimension at 66. The tendon repair system 10 may generate a tear area size at 68 based off of dimensions inputted into the system 10. The tendon repair system 10 may generate a solution including one or more tendon anchors 26 and the specific type of tendon anchor 26. The tendon repair system 10 may generate a solution including multiple solutions of different types of tendon anchors 26. The solutions may include multiple solutions. The solutions may include different numbers of a same type of tendon anchor 26, multiple solutions whereby each solution includes the same number of tendon anchors 26 but each solution has a different type of anchor 26 than the other solutions, a combination of different types of tendon anchors 26 used in a single solution, combinations of different types of tendon anchors 26 used in multiple solutions and other solutions not mentioned and heretofore yet to be conceived. In at least one embodiment, the tendon repair system 10 may decide which and how many anchors 26 to use in a tendon repair procedure.

The tendon repair system 10 may generate a free tendon-to-bone healing area 28 for one or more, or all, of the proposed solutions at 78. The free tendon-to-bone healing area 28 is calculated based on tear size and anchor type. The free tendon-to-bone healing area 28 is that surface area of the tear that is not covered by an anchor, thereby enabling the tendon to reattach to the bone.

In proposing one or more solutions, the tendon repair system 10 may select solutions from different repair techniques, different anchor types and different anchor sizes. In at least one embodiment, the tendon repair system 10 may identify solutions including a medial row of anchors 26 as generally being a solution of one to three anchors 26. The tendon repair system 10 may identify solutions depending on the tear area size 24. The tendon repair system 10 may identify solutions including one or more techniques including, but not limited to, single row, double row and extended double row. In at least one embodiment, the tendon repair system 10 may identify multiple solutions in which at least two of the solutions each propose a different technique than the technique proposed in the other solution. The tendon repair system 10 may be configured to recommend a chosen solution. The surgeon may elect to chose the solution offered by the repair system 10 or to elect a solution of the surgeon's choosing.

The tendon repair system 10 may display the various information generated by the system 10 via a graphical user interface. In at least one embodiment, the tendon repair system 10 may display output including the free healing area 28 for the tendon as an area not covered by the tendon anchors 26, as shown in FIGS. 9-15. The tendon repair system 10 may display output including multiple types of tendon anchors and the number of each type of tendon anchor needed, as shown in FIGS. 9-15. The tendon repair system 10 may display output including displaying at least one combination with multiple types of tendon anchors. The tendon repair system 10 may display output including different repair techniques depending on the technique (single row, double row, extended double row) and the size of the tear. The tendon repair system 10 may display output including a graphical representation of one or more proposed solutions. The tendon repair system 10 may display output including one or more graphical representations of a plurality of proposed solutions. The tendon repair system 10 may display output including numerical description of a solution, a graphical representation of a solution, or a written description of a solution, or any combination thereof. In particular, in at least one embodiment, the tendon repair system 10 may display output that includes a graphical representation, numerical and written descriptions of at least one proposed solution. The tendon repair system 10 may display output that includes a plurality of graphical representations, numerical and written descriptions for a plurality of proposed solutions.

Figure 16:
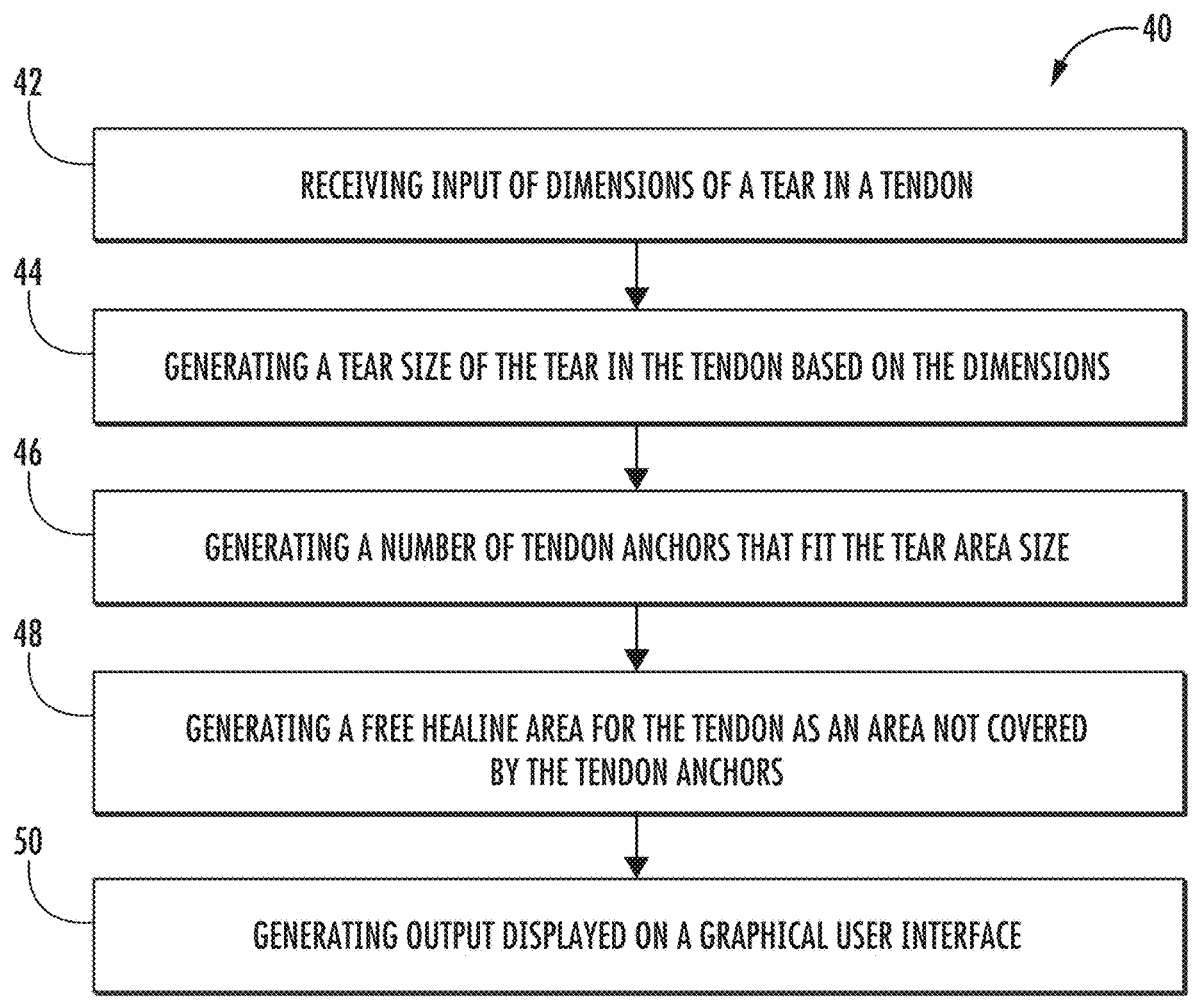
FIG. 16 is a flow chart of a method of generating different options for a tendon repair procedure.

A method 40 for determining components to be used in a tendon repair surgery is disclosed, as shown in FIG. 16. The method 40 may include receiving at 42 input of dimensions of a tear in a tendon. The method 40 may include generating at 44 a tear area size of the tear in the tendon based on the dimensions. The method 40 may include generating at 46 a number of tendon anchors that fit the tear area size. The method 40 may include generating at 48 a free healing area 28 for the tendon 22 as an area not covered by the tendon anchors 26. The method 40 may include generating at 50 output displayed on a graphical user interface 30.

Generating at 50 output displayed on a graphical user interface 30 may include displaying output including the number of tendon anchors 26 that fit the tear area size 24. In at least one embodiment, generating at 50 output displayed on a graphical user interface 30 may include displaying output comprising a particular type of tendon anchors 26 that fit the tear area size 24. Generating at 50 output displayed on a graphical user interface 30 may include displaying output including the free healing area 28 for the tendon 22 as an area not covered by the tendon anchors 26. Generating at 50 output displayed on a graphical user interface 30 may include displaying output that includes a graphical representation of one or more proposed solutions.

The system 10 may also be configured to include a non-transitory computer-readable device 60 comprising instructions, which when loaded and executed by a processor 62, cause the processor 62 to perform operations including receiving at 42 input of dimensions of a tear in a tendon 22. The non-transitory computer-readable device 60 may also include instructions which cause the processor 62 to perform operations including generating at 44 a tear area size 24 of the tear in the tendon 22 based on the dimensions. The non-transitory computer-readable device 60 may also include instructions which cause the processor 62 to perform operations including generating a number of tendon anchors 26 that fit the tear area size 24. The non-transitory computer-readable device 60 may also include instructions which cause the processor 62 to perform operations including generating a free healing area 28 for the tendon 22 as an area not covered by the tendon anchors 26. The non-transitory computer-readable device 60 may also include instructions which cause the processor 62 to perform operations including generating output displayed on a graphical user interface 30.

Figure 18:
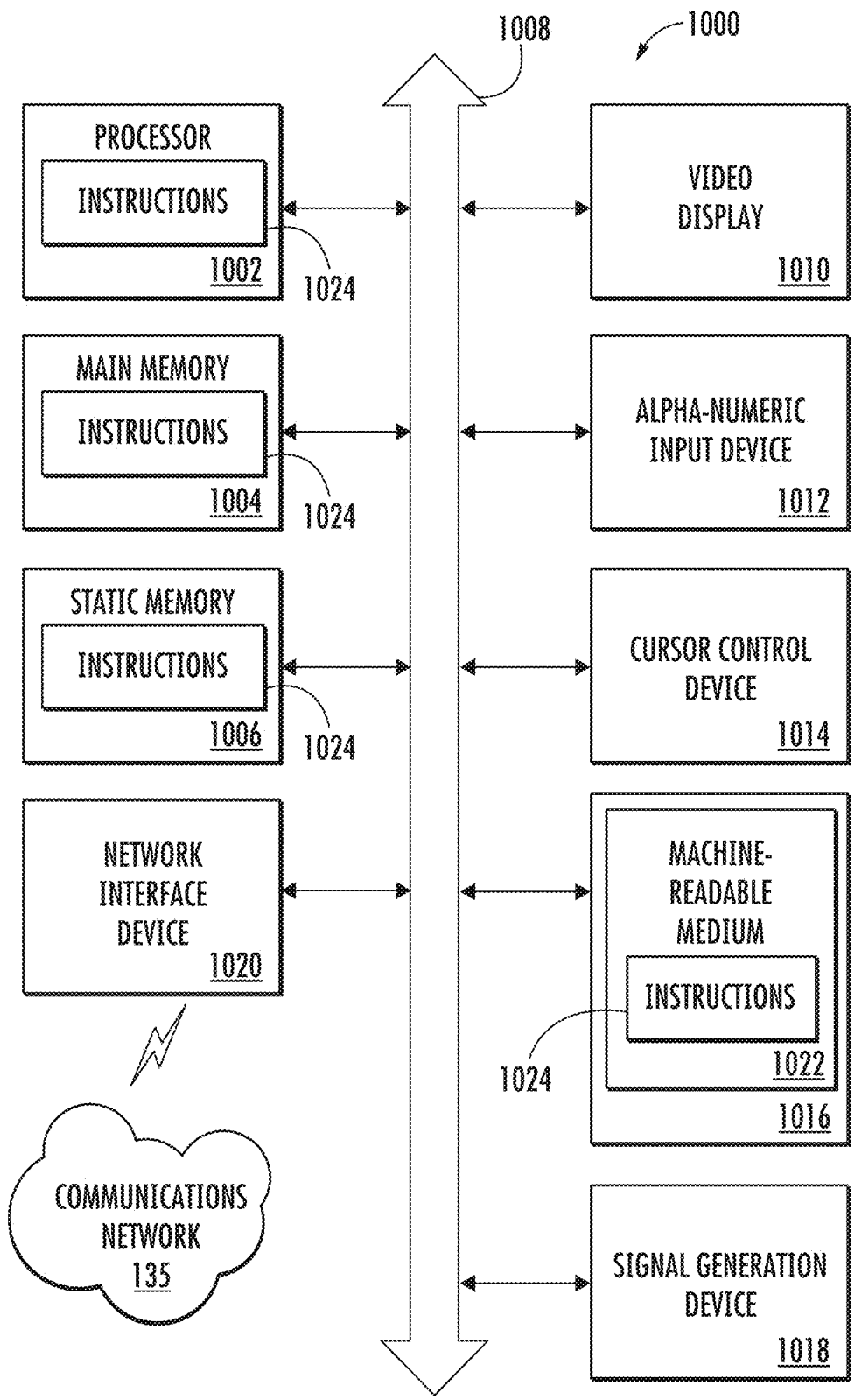
FIG. 18 is a schematic diagram of a machine in the form of a computer system within which a set of instructions, when executed, may cause the machine to perform any one or more of the methodologies or operations of the systems and methods for generating different options for tendon repair.

As shown in FIGS. 17 and 18, systems 10 and methods 40 for determining elapsed time for a surgical procedure conducted using an endoscope 12 are disclosed. The system 10 may be configured for interactively visualizing different options for tendon repair for a surgeon and for informing the surgeon in a descriptive way of the different options is disclosed. The diagnostics and review of the data system 10 may take place anywhere desired. The system 10 may be configured to be accessible via system such as, but not limited to, machine learning services, data and content services, computing applications and services, cloud computing services, internet services, satellite services, telephone services, software as a service (SaaS) applications and services, mobile applications and services, platform as a service (PaaS) applications and services, web services, client servers, and any other computing applications and services. The system 10 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 10. The system 10 may include any number of users.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 10, and to interact with the system 10 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 10 may include a second user 110, who may utilize a second user device 111 to access data, content, and applications, or to perform a variety of other tasks and functions. As with the first user 101, in certain embodiments, the second user 110 may be any type of user that may review data from the system 10, total elapsed time of use of an endoscope in a patient 32, or other relevant data. Much like the first user 101, the second user 110 may utilize second user device 111 to access an application (e.g. a browser or a mobile application) executing on the second user device 111 that may be utilized to access web pages, data, and content associated with the system 10. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 10, and to interact with the system 10. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 10, any network in the system 10, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 10 may also include a communications network 135. The communications network 135 of the system 10 may be configured to link each of the devices in the system 10 to one another. For example, the communications network 135 may be utilized by the first user device 102 to connect with other devices within or outside communications network 135. Additionally, the communications network 135 may be configured to transmit, generate, and receive any information and data traversing the system 10.

In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 10 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 10, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 10, or any combination thereof.

The database 155 of the system 10 may be utilized to store and relay information that traverses the system 10, cache information and/or content that traverses the system 10, store data about each of the devices in the system 10, and perform any other typical functions of a database. In certain embodiments, the database 155 may store the output from any operation performed by the system 10, operations performed and output generated by the first and second user devices 102, 111, the servers 140, 150, 160, or any combination thereof. In certain embodiments, the database 155 may store a record of any and all information obtained from any data sources utilized by the system 10 to facilitate the operative functions of the system 10 and its components, store any information and data obtained from the internal and external data sources 201, 202, store the agglomerated models 208, store outputs generated by an application under evaluation 230, store feedback received from the first and second users 101, 110 and/or the first and second user devices 102, 111, store inputs entered into or utilized to interact with the application under evaluation 230, store software code 245 generated by the system 10, store reports 242 generated by the system 10, store analyses 243 generated by the system 10, store test results 246 generated by the system 10, store test data 247, store media training videos and media content, store any information generated and/or received by the system 10, any other data traversing the system 10, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 10. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 10, any other device, any network, or any combination thereof.

The database 155 may also store information obtained from the system 10, store information associated with the first and second users 101, 110, store location information for the first and second user devices 102, 111 and/or first and second users 101, 110, store user profiles associated with the first and second users 101, 110, store device profiles associated with any device in the system 10, store communications traversing the system 10, store user preferences, store demographic information for the first and second users 101, 110, store information associated with any device or signal in the system 10, store information relating to usage of applications accessed by the first and second user devices 102, 111, store any information obtained from any of the networks in the system 10, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, etc.), attributes of the device, any other information, or a combination thereof.

In certain embodiments, the database 155 may store algorithms facilitating the operation of the system 10 itself, any software application utilized by the system 10, or any combination thereof. In certain embodiments, the database 155 may be configured to store any information generated and/or processed by the system 10, store any of the information disclosed for any of the operations and functions disclosed for the system 10 herewith, store any information traversing the system 10, or any combination thereof. Furthermore, the database 155 may be configured to process queries sent to it by any device in the system 10.

In certain embodiments, the system 10 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof.

The system 10 may also include a software application or program, which may be configured to perform and support the operative functions of the system 10. In certain embodiments, the application may be a software program, a website, a mobile application, a software application, a software process, or a combination thereof, which may be made accessible to users utilizing one or more computing devices, such as first user device 102 and second user device 111. The application of the system 10 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof.

The systems and methods disclosed herein may include further functionality and features. For example, the operative functions of the system 10 and methods 30 may be configured to execute on a special-purpose processor specifically configured to carry out the operations provided by the system 10 and methods 30. Notably, the operative features and functionality provided by the system 10 and methods 30 may increase the efficiency of computing devices that are being utilized to facilitate the functionality provided by the system 10 and methods 30. For example, the system 10 and methods 30 can optimize the performance of future actions through machine learning, such that a reduced amount of computer operations need to be performed by the devices in the system 10 using the processors and memories of the system 10 than in systems that are not capable of machine learning as described in this disclosure. In such a context, less processing power may need to be utilized because the processors and memories do not need to perform actions, operations, and analyses that have already been conducted by the system 10. In certain embodiments, the system 10 may learn that certain state(s) associated with and/or from discovery and/or testing may be faster on certain processing hardware. For example, for a state with complex mathematical operations and/or graphics, the system 10 may perform better when there is a floating point processor or a graphics processing unit. As a result, the functionality provided by the system 10 and methods 30 may provide substantial savings in the usage of computer resources by utilizing the software and functionality provided in the present disclosure.

Notably, in certain embodiments, various functions and features of the system 10 and methods may operate without human intervention and may be conducted entirely by computing devices, robots, programs, and/or processes. For example, in certain embodiments, multiple computing devices may interact with devices of the system 10 to provide the functionality supported by the system 10. Additionally, in certain embodiments, system 10 may operate continuously to reduce the possibility of defects, conflicts, and/or errors from being introduced into the system 10. In certain embodiments, the system 10 and method may also provide effective computing resource management by utilizing the features and functions described in the present disclosure. For example, in certain embodiments, the system 10 may specify a quantity of computer processor resources (e.g. processor clock cycles, processor speed, processor cache, etc.) that may be dedicated to obtaining data from the camera 20. For example, the system 10 may indicate a quantity of processor cycles of a processor that may be utilized to obtain data, process obtained data, and/or specify a selected amount of processing power that may be dedicated to obtaining and processing data from the camera 20.

In certain embodiments, any device or program in the system 10 may transmit a signal to a memory device to cause the memory device to only dedicate a selected amount of memory resources to the various operations of the system 10. In certain embodiments, the system 10 and methods may also include transmitting signals to processors and memories to only perform the operative functions of the system 10 and methods 30 at time periods when usage of processing resources and/or memory resources in the system 10 is at a selected and/or threshold value. In certain embodiments, the system 10 and methods may include transmitting signals to the memory devices utilized in the system 10, which indicate which specific portions (e.g. memory sectors, etc.) of the memory should be utilized to store any of the data utilized or generated by the system 10. Notably, the signals transmitted to the processors and memories may be utilized to optimize the usage of computing resources while executing the operations conducted by the system 10. As a result, such features provide substantial operational efficiencies and improvements over existing technologies.

Figure 6:
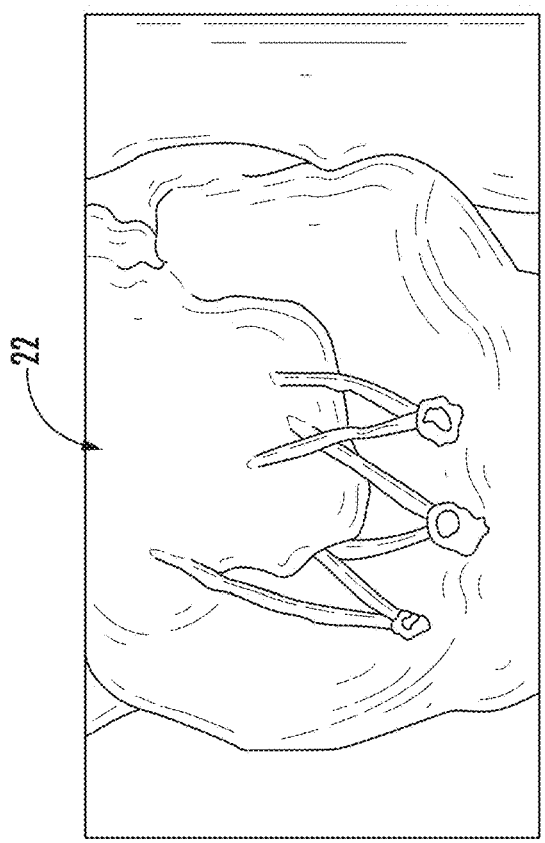
FIG. 6 is a perspective view of a repaired tear in a rotator cuff tendon.
Figure 5:
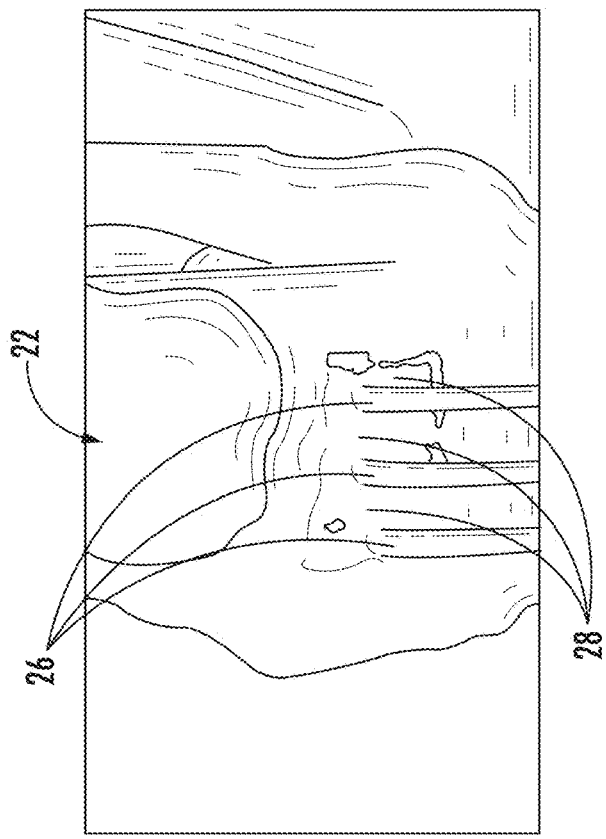
FIG. 5 is a perspective view of anchor placement for a tear in a rotator cuff tendon.
Figure 7:
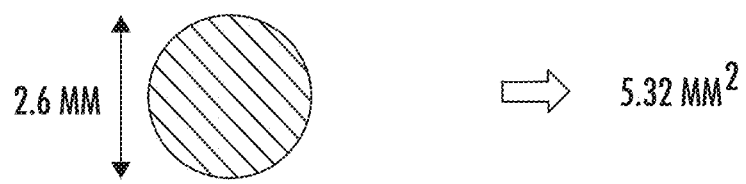
FIG. 7 is a cross-sectional view of two different sizes of tendon anchors.
Figure 7:
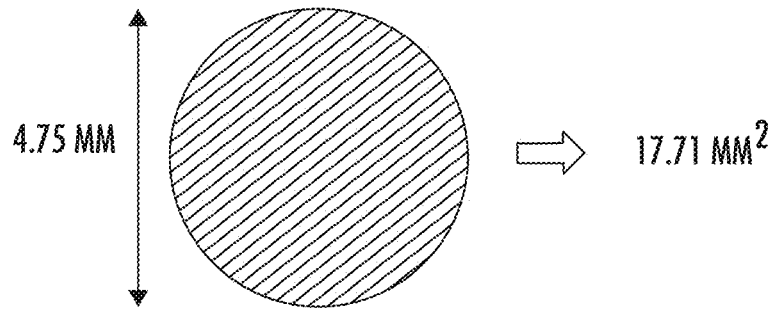
Figure 8:
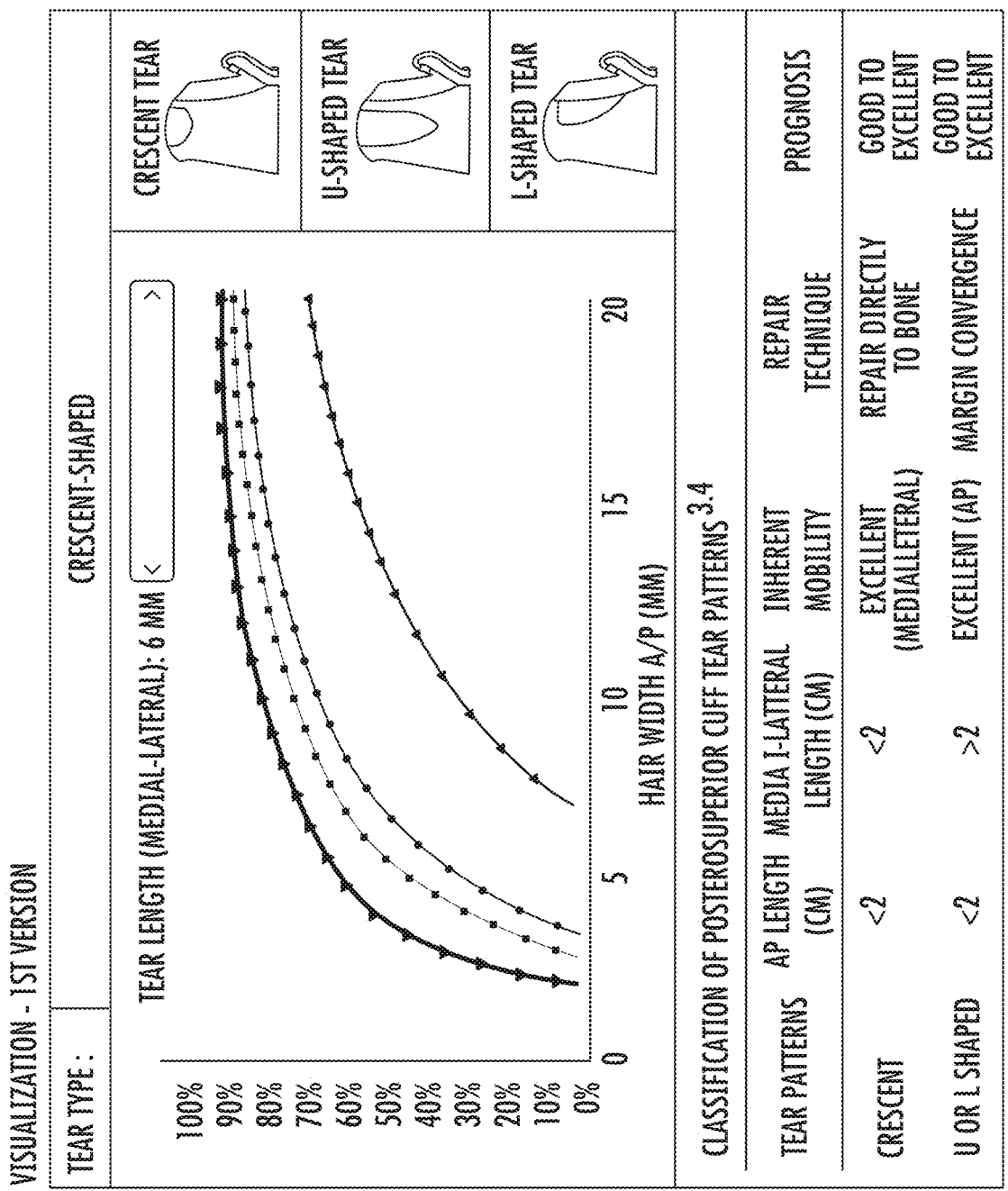
FIG. 8 is a graphical depiction of free footprint area for healing versus tendon tear width for 4 different size tendon anchors.

Referring now also to FIG. 6, at least a portion of the methodologies and techniques described with respect to the exemplary embodiments of the system 10 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 10. For example, the machine may be configured to, but is not limited to, assist the system 10 by providing processing power to assist with processing loads experienced in the system 10, by providing storage capacity for storing instructions or data traversing the system 10, or by assisting with any other operations conducted by or within the system 10.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. The machine may assist with operations performed by other component in the system, any programs in the system, or any combination thereof. The machine may be connected with any component in the system 10. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 62 (e.g., a central processing unit (CPU), a graphics processing unit (GPU, or both), a main memory 1004 and a static memory 1006, which communicate with each other via a bus 1008. The computer system 100 may further include a video display unit 1010, which may be, but is not limited to, a liquid crystal display (LCD), a flat panel, a solid state display, or a cathode ray tube (CRT). The computer system 100 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 62, or a combination thereof, during execution thereof by the computer system 100. The main memory 1004 and the processor 62 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations may include, but are not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 135, another network, or a combination thereof, can send or receive voice, video or data, and communicate over the communications network 135, another network, or a combination thereof, using the instructions. The instructions 1024 may further be transmitted or received over the communications network 135, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A tendon repair system, comprising:
   a memory that stores instructions; and
   a processor that executes the instructions to perform operations, the operations comprising:
   receiving input of dimensions of a tear in a tendon;
   generating a tear area size of the tear in the tendon based on the dimensions;
   generating a number of tendon anchors that fit the tear area size;
   generating a free healing area for the tendon to identify a superior free healing area, wherein the free healing area is an area not covered by the tendon anchors; and
   generating output displayed on a graphical user interface to identify a superior number of tendon anchors and the superior free healing area.

2. The tendon repair system of claim 1, wherein generating output displayed on a graphical user interface comprises displaying output comprising the number of tendon anchors that fit the tear area size.

3. The tendon repair system of claim 1, wherein generating output displayed on a graphical user interface comprises displaying output comprising a particular type of tendon anchors that fit the tear area size.

4. The tendon repair system of claim 1, wherein generating output displayed on a graphical user interface comprises displaying output comprising the free healing area for the tendon as an area not covered by the tendon anchors.

5. The tendon repair system of claim 1, wherein generating output displayed on a graphical user interface comprises displaying output comprising multiple types of tendon anchors and the number of each type of tendon anchor needed.

6. The tendon repair system of claim 5, wherein displaying output comprising multiple types of tendon anchors and the number of each type of tendon anchor needed comprises displaying at least one combination with multiple types of tendon anchors.

7. The tendon repair system of claim 1, wherein generating output displayed on a graphical user interface comprises displaying output comprising a maximum distance between anchors.

8. The tendon repair system of claim 1, wherein generating output displayed on a graphical user interface comprises displaying output comprising different repair techniques.

9. The tendon repair system of claim 1, further comprising receiving a minimum distance between anchors.

10. The tendon repair system of claim 1, wherein generating output displayed on a graphical user interface comprises displaying output that includes a graphical representation of at least one proposed solution.

11. The tendon repair system of claim 10, wherein displaying output that includes a graphical representation of at least one proposed solution comprises displaying at least one graphical representation of a plurality of proposed solutions.

12. The tendon repair system of claim 1, wherein generating output displayed on a graphical user interface comprises displaying output that includes at least one numerical and written description of a solution.

13. The tendon repair system of claim 1, wherein generating output displayed on a graphical user interface comprises displaying output that includes a graphical representation, numerical and written descriptions of at least one proposed solution.

14. The tendon repair system of claim 13, wherein displaying output that includes a graphical representation, numerical and written descriptions of at least one proposed solution comprises displaying output that includes a plurality of graphical representations, numerical and written descriptions of a plurality of proposed solutions.

15. A method for determining components to be used in a tendon repair surgery, comprising:
receiving input of dimensions of a tear in a tendon;
generating a tear area size of the tear in the tendon based on the dimensions; generating a number of tendon anchors that fit the tear area size;
generating a free healing area for the tendon to identify a superior free healing area, wherein the free healing area is an area not covered by the tendon anchors; and
generating output displayed on a graphical user interface to identify a superior number of tendon anchors and the superior free healing area.

16. The method of claim 15, wherein generating output displayed on a graphical user interface comprises displaying output comprising the number of tendon anchors that fit the tear area size.

17. The method of claim 15, wherein generating output displayed on a graphical user interface comprises displaying output comprising a particular type of tendon anchors that fit the tear area size.

18. The method of claim 15, wherein generating output displayed on a graphical user interface comprises displaying output comprising the free healing area for the tendon as an area not covered by the tendon anchors.

19. The method of claim 15, wherein generating output displayed on a graphical user interface comprises displaying output that includes a graphical representation of at least one proposed solution.

20. A non-transitory computer-readable device comprising instructions, which when loaded and executed by a processor, cause the processor to perform operations comprising:
receiving input of dimensions of a tear in a tendon;
generating a tear area size of the tear in the tendon based on the dimensions;
generating a number of tendon anchors that fit the tear area size;
generating a free healing area for the tendon to identify a superior free healing area, wherein the free healing area is an area not covered by the tendon anchors; and
generating output displayed on a graphical user interface to identify a superior number of tendon anchors and the superior free healing area.

\* \* \* \* \*